United States Patent [19]

Armbruster et al.

[11] Patent Number: 4,487,868

[45] Date of Patent: Dec. 11, 1984

[54] FOUNDRY CORE COMPOSITIONS

[75] Inventors: David R. Armbruster, Forest Park; Luis R. Rodriguez, Oak Park, both of Ill.

[73] Assignee: Acme Resin Corporation, Forest Park, Ill.

[21] Appl. No.: 497,961

[22] Filed: May 25, 1983

[51] Int. Cl.$^3$ .................... C08G 5/04; C08L 1/28
[52] U.S. Cl. ........................ 524/44; 524/48; 524/492; 523/139; 523/144; 523/145; 106/38.23; 164/527
[58] Field of Search .............. 524/44, 48, 492; 523/139, 144, 145; 106/38.22, 38.23, 38.3; 164/526, 527

[56] References Cited

U.S. PATENT DOCUMENTS

| | | | |
|---|---|---|---|
| 3,059,297 | 10/1962 | Dunn et al. | 22/193 |
| 3,179,523 | 4/1965 | Moréu | 106/38.23 |
| 3,184,814 | 5/1965 | Brown | 22/193 |
| 3,288,734 | 11/1966 | Stalego | 524/48 |
| 3,312,650 | 4/1967 | Case et al. | 524/596 |
| 3,395,206 | 7/1968 | Schneider | 264/225 |
| 3,480,573 | 11/1969 | Thompson et al. | 523/147 |
| 3,725,333 | 4/1973 | Adkins et al. | 523/144 |
| 3,755,229 | 8/1973 | Johnson et al. | 523/144 |
| 4,210,562 | 7/1980 | McCombs | 524/44 |
| 4,215,206 | 7/1980 | Hanesworth et al. | 164/527 |
| 4,289,803 | 9/1981 | Wales | 427/134 |
| 4,311,619 | 1/1982 | Seeney et al. | 524/841 |
| 4,317,763 | 3/1982 | Meating | 523/144 |
| 4,371,648 | 2/1983 | Gardikes et al. | 523/144 |

*Primary Examiner*—John Kight
*Assistant Examiner*—Nathan M. Nutter
*Attorney, Agent, or Firm*—Stanley M. Parmerter

[57] ABSTRACT

A foundry core composition containing a rapid-curing furfuryl alcohol and phenolic resole resin system useful in the "hot-box" process is provided. This composition includes an acidic curing agent of low toxicity whose catalytic activity is enhanced by the presence of a water-soluble polymeric polyhydroxy compound.

9 Claims, No Drawings

FOUNDRY CORE COMPOSITIONS

FIELD OF THE INVENTION

This invention relates to improvements in resin binders useful for making foundry cores and molds produced by the "hot-box process".

BACKGROUND OF THE INVENTION

In the foundry industry, processes involving the use of shell molds and cores formed from sand and a resinous binder are well known. Normally, such processes involve intimately mixing sand particles with a small quantity of thermosetting resin, forming the mixture into a desired shape, and curing the resin in the mixture by heating the shaped mass at elevated temperatures. The resulting mold or core is of adequate hardness to shape molten metals poured thereover to form a metal cast.

Foundry cores and molds produced by the "hot-box process" in which the sand and binder are invested on a heated pattern, cured and ejected from the pattern are especially advantageous since this process can be carried out at high speed. For some time, the most important resin binders used in the "hot-box process" contained phenol-urea-formaldehyde resins or furfuryl alcohol-urea-formaldehyde resins. In the presence of an acid catalyst, these resin systems cure rapidly and give cores and molds with high tensile strengths. Examples of the "hot-box process" using these binder compositions are disclosed in U.S. Pat. Nos. 3,059,297 and 3,480,573. Such binder systems are useful in many high-speed production operations where a high percentage of nitrogen from urea resins does not cause difficulties. In certain types of metal casting operations, however, high percentages of nitrogen can cause pinholing and other casting defects. Steel castings are particularly sensitive to nitrogen pinholing. For this reason, it is desirable to have foundry resin binders containing little or no nitrogen.

Resin binder systems with low nitrogen content have been disclosed in U.S. Pat. Nos. 3,725,333 and 3,755,229. These use a resin mixture which consists of furfuryl alcohol and phenolic resole resin. In order to obtain cores or molds that cure quickly to high tensile strength, the acid salts, tin chloride or chromium nitrate, were used as catalysts with the resins. Although these systems give good cores and molds, they give rise to certain enviromental problems. The tin chlorides tend to give off irritating fumes during handling and their solutions are corrosive to metal and skin tissue. Chromium salts are highly toxic and chromium compounds are listed as priority toxic pollutants by the Environmental Protection Agency. Thus, for safety and ecological reasons, there is a need for a low-nitrogen resin binder system that can be cured with less-corrosive and less-toxic catalysts.

The nitrate salts of aluminum and iron are much more acceptable from the ecological viewpoint, but they are less effective catalysts for "hot-box" resin systems. It would, therefore, be an important advance in the art if a means could be provided to enhance the catalytic effect of these salts.

SUMMARY OF THE INVENTION

In accordance with this invention, there is provided an acidic curing agent which causes the rapid curing of resin systems containing phenolic resole resin and furfuryl alcohol used in the preparation of foundry cores and molds. This system comprises from about 5% to about 60% by weight of an acid salt selected from the group consisting of aluminum nitrate, ferric nitrate and mixtures thereof, from about 2% to about 20% by weight of a water-soluble polymeric polyhydroxy compound, and at least sufficient water to give a homogeneous solution.

Additionally, in accordance with this invention, there is provided a foundry core composition comprising a mixture of sand and from about 0.8% to about 4% by weight of sand, of a binder composition. The binder composition contains a resin-forming component comprising furfuryl alcohol and phenolic resole resin, the weight ratio of the furfuryl alcohol to phenolic resole resin being from about 0.05:1 to about 2:1. The binder composition also contains from about 0.4% to about 5% by weight of a water-soluble polymeric polyhydroxy compound, from about 5% to about 40% by weight of a curing agent comprising an acid salt selected from the group consisting of aluminum nitrate, ferric nitrate and mixtures thereof, and an amount of water at least sufficient to dissolve the acid salt.

DETAILED DESCRIPTION OF THE INVENTION

The process for forming "hot-box" cores and molds according to this invention involves mixing sand or other refractory material with an acidic catalyst and the resin material as herein described. This invention involves bringing the novel resin-sand-catalyst mixture into contact with metal patterns to form cores or molds suitable for casting metal, curing the core or mold and removing it from the pattern. The temperatures used in forming the molds and cores are from about 300° F. to about 550° F., and the other procedures involved are those generally employed in the "hot-box" art.

Any of the refractory materials commonly used to make foundry cores and molds can be employed in the foundry core compositions of this invention. These materials include silica sands, lake sands, bank sands, zircon sand, chromite sand, olivine sand, and the like. Also mixtures of these may be used.

The foundry core compositions of the present invention use resin systems which contain a phenolic resole resin and furfuryl alcohol. Phenolic resole resins suitable for use in this invention are well known. Such resins can be prepared by reacting one or more moles of formaldehyde per mole of phenolic compound in the presence of a basic catalyst, for example, calcium hydroxide. Useful phenolic compounds include, for example, phenol, o-cresol, m-cresol, bisphenol-A, p-t-butylphenol and mixtures thereof. Phenol is the preferred phenolic compound. The mole ratio of formaldehyde to phenol in the resole resin can be in the range of from 1:1 to 3:1. The preferred mole ratio of formaldehyde to phenol is 1.5:1 to 3:1. The reaction between the formaldehyde and phenol is carried out at a temperature of from about 55° C. to about 90° C. If it is not stopped, the reaction between the phenolic compound and the formaldehyde will proceed with cross-linking to a gelled structure. However, by cooling the reaction mixture, the rate of reaction can be slowed, and for practical purposes stopped at any point short of gelatinization. Thus, suitable resole resins of low molecular weight can be prepared.

The amount of furfuryl alcohol added to the phenolic resin can vary over a wide range. The weight ratio of furfuryl alcohol to phenolic resole can be in the range of from about 0.05:1 to about 2:1. The preferred weight ratio of furfuryl alcohol to phenolic resole is from about 0.1:1 to about 0.7:1. Furfuryl alcohol suitable for use in this invention includes monomeric furfuryl alcohol, and low viscosity polymers thereof, for example, polymers having a viscosity of less than 500 centipoises at 25° C.

The resin system used in the practice of this invention can be a physical mixture of the phenolic resole resin and furfuryl alcohol. Alternatively, these two components can be heated together to give a furan-modified resole resin.

The curing agent of the invention is preferably used in the form of a solution comprised of from about 5% to about 60% by weight of aluminum nitrate, ferric nitrate, or mixtures thereof, dissolved in water. Optionally, the curing agent may also contain up to 45% by weight of urea, with the preferred amount of urea being in the range of from about 15% to about 45% by weight. This amount of urea serves to reduce the formaldehyde odor in the resin binder composition and to enhance the cure speed without contributing sufficient nitrogen to cause pinholing or other defects in the casting.

It has been discovered that the presence of a water-soluble polymeric polyhydroxy compound increases the curing speed of the binder composition with aluminum nitrate and ferric nitrate catalysts. This discovery makes this low-nitrogen, ecologically-acceptable system useful commercially. Suitable polyhydroxy compounds include polyvinyl alcohol, carbohydrate polymers and derivatives, such as dextrin and hydroxyethyl cellulose, and mixtures thereof. They are preferably ones that give aqueous solutions of sufficient fluidity so that they can be coated readily on the surface of the sand or other refractory material which makes up the largest part of the core or mold.

In one embodiment of the invention, the polymeric polyhydroxy compound is mixed with an acid salt to give an acidic curing agent. When it is used in this manner, the polyhydroxy compound comprises from about 2% to about 20% by weight of the acidic curing agent.

In an alternate embodiment of the invention, the polymeric polyhydroxy compound is added directly to the sand or mixed with the resin-forming component which comprises furfuryl alcohol and phenolic resole resin. When it is used in this fashion, sufficient polyhydroxy compound is added so that the entire binder composition, including resin and catalyst, contains from about 0.4% to about 5% weight of the polyhydroxy compound.

Novel foundry core compositions employing the binder compositions of this invention are prepared by mixing the binder composition and sand. Particularly suitable foundry compositions can be formed by mixing from about 0.8% to about 4% by weight, preferably about 1% to about 3% by weight of sand, of the binder composition of this invention with sand in such a manner that the binder composition is coated on the sand. The term "binder composition", as used herein, includes the resins, catalysts, polyhydroxy compounds and any other materials mixed with them before they are coated on the sand.

In practice, suitable foundry core compositions can be formed in a variety of ways. For example, the foundry core compositions can be formed in a one-step process by adding the entire binder composition to sand and mixing the resulting combination to obtain a coated sand. Suitable foundry compositions can also be obtained by a two-step process. One such process can involve first addding the phenolic resole resin and furfuryl alcohol constituents of the binder composition to the sand and mixing to form a mixture of the resin-forming component and sand, and in a second step, adding the catalyst component. Similarly, another two-step process can involve first forming a mixture of sand and a suitable amount of the catalyst component, and then in a second step adding a suitable amount of the phenolic resole resin and furfuryl alcohol constituents of the binder compositions of the invention. This latter process is a preferred manner of forming foundry core compositions. In forming the foundry core compositions, an amount of water can be added to the sand or included in the binder composition to obtain a desirable consistency suitable for coating the sand. Preferably, the phenolic resole resin and furfuryl alcohol components are added to the sand in the form of an aqueous solution or water mixture and preferably the catalyst component of the binder is added to the sand in the form of an aqueous solution.

It is often the practice in the foundry art to add various substances to the resin or to the sand used to prepare foundry cores and molds. These additives include such materials as silanes, deodorizing agents, iron oxide, and the like. They can be used in the present process and do not interfere with the improved properties of the present compositions.

The following examples illustrate certain embodiments of the present invention. Unless otherwise stated, all proportions and percentages are provided on the basis of weight.

EXAMPLE 1

A mixture of 955 g of 50% formaldehyde, 336 g of water, 598 g of phenol and 12 g of calcium hydroxide was stirred at a temperature of 70° C. for 4.5 hours. The mixture was cooled to 25° C. before 32 g of 35% hydrochloric acid was added which reduced the pH of the mixture to 4.5. To the acidified resole resin solution was added 345 g of a 10% solution of polyvinyl alcohol (Gelvatol 20–30, a polyvinyl alcohol with a weight average molecular weight of approximately 10,000 available from the Monsanto Industrial Chemicals Company). The mixture was dehydrated under vacuum at about 45° C. until the refractive index of the mixture reached 1.571 (measured at 25° C.). Then 353 g of furfuryl alcohol and 1.5 g of Silane A-1100 (a silane coupling agent available from the Union Carbide Corporation) were added. The resulting resin mixture had a final viscosity of 682 centipoises at 25° C.

To a K-45 Kitchen-Aid mixer was added 2500 g of lake sand. The sand was brought to a temperature of about 25° C. before 8.8 g of a catalyst containing 30% $Al(NO_3)_3 \cdot 9H_2O$, 25% urea and 45% water was added. The combination was mixed for 1 minute. Then 35 g of the resin mixture was added and mixing was continued for another 3 minutes. Test cores were prepared from the sand mix by blowing sand at 80 psi into a heated (425° F.) Dietert No. 372 Hot-Box Tensile Curing machine to form 1-inch dog-bone tensile briquets. Test cores (dog bones) were then removed at various dwell times and allowed to cool to room temperature before their tensile strength was measured. Tensile strength measurements were made using a Detroit Testing Machine Company Model CST Tensile Tester. Average tensile data for 2 or 3 cores in pounds per square inch (psi) are given in Table I. Also included in Table I are comparative test results using a resin mixture containing no polyvinyl alcohol. These results show the improvement in test core performance when polyvinyl alcohol is present in the resin mixture.

TABLE I

| Resin | Tensile Strength (psi) After Dwell Times of | | | |
|---|---|---|---|---|
| | 10 sec | 20 sec | 30 sec | 40 sec |
| Example 1 | 165 | 380 | 450 | 330 |
| Comparative Test 1 | 145 | 295 | 295 | 250 |

EXAMPLE 2

The general procedure of Example 1 was followed except that an additional 15% furfuryl alcohol was added to the resin and to the comparative test resin. Results given in Table II again show the superiority of the resin system (Example 2) which contains polyvinyl alcohol.

TABLE II

| Resin | Tensile Strength (psi) After Dwell Times of | | | |
|---|---|---|---|---|
| | 10 sec | 20 sec | 30 sec | 40 sec |
| Example 2 | 216 | 396 | 408 | 400 |
| Comparative Test 2 | 127 | 313 | 307 | 287 |

EXAMPLE 3

The resin mixtures used in Example 1 and Comparative Test 1 were employed in sand tests using 8.8 g of a catalyst containing 24% $Fe(NO_3)_3$, 25% urea and 51% water. The test conditions were otherwise the same as given in Example 1. Results given in Table III show the superiority of the resin system containing polyvinyl alcohol (Example 3) when it is used with a ferric nitrate as well as with an aluminum nitrate catalyst system.

TABLE III

| Resin | Tensile Strength (psi) After Dwell Times of | | | |
|---|---|---|---|---|
| | 10 sec | 20 sec | 30 sec | 40 sec |
| Example 3 | 143 | 266 | 520 | 530 |
| Comparative Test 3 | 118 | 205 | 422 | 418 |

EXAMPLE 4

In this example, polyvinyl alcohol is incorporated into the catalyst system. Sand tests were performed by mixing 2500 g of lake sand with 8.8 g of a catalyst solution containing 28% $Al(NO_3)_3$ (60% solution in water), 25% urea and 47% water to which varying amounts of polyvinyl alcohol (PVA) had been added. The sand and catalyst mixture was stirred for 1 minute before 35 g of the resin of Comparative Test 1 (containing no polyvinyl alcohol) was added. Mixing was continued for an additional 3 minutes before the sand was blown into the hot-box machine to 425° F. and held at this temperature for various lengths of time. The resulting test cores were removed from the mold and their tensile strengths were determined by the method described in Example 1. The results given in Table IV show that the polyvinyl alcohol is effective in increasing resin performance when incorporated in the catalyst system.

TABLE IV

| Cure Time (sec) | Cold Tensile Strength (psi) | | | |
|---|---|---|---|---|
| | No PVA in Catalyst[1] | 0.35 g PVA in Catalyst | 0.73 g PVA in Catalyst | 1.2 g PVA in Catalyst |
| 10 | 183 | 152 | 180 | 157 |
| 20 | 290 | 272 | 378 | 304 |
| 30 | 265 | 452 | 553 | 457 |
| 40 | 215 | 485 | 505 | 380 |

[1]Used for comparison tests - not the system of this invention.

EXAMPLE 5

This example shows that other water soluble polymeric polyhydroxy compounds can be used in the process of this invention in place of polyvinyl alcohol. The general procedure of Example 4 was followed except that the polyvinyl alcohol was replaced by either dextrin (a starch gum available from the Eastman Kodak Company as Catalog No. 1297) or Natrosol 250LR (a 2.5 molar substituted hydroxyethyl ether of cellulose whose 5% aqueous solution has a Brookfield viscosity of 75-150 centipoises at 25° C.). Test results are given in Table V.

TABLE V

| Cure Time (sec) | Cold Tensile Strength (psi) | | |
|---|---|---|---|
| | No Added Polyhydroxy Compound[1] | 0.73 g Dextrin in Catalyst | 0.38 g Natrosol in Catalyst |
| 10 | 183 | 163 | 122 |
| 20 | 290 | 332 | 242 |
| 30 | 265 | 472 | 410 |
| 40 | 215 | 458 | 435 |

[1]Used for comparison tests - not the system of this invention.

EXAMPLE 6

The general procedure of Example 1 was followed except that the catalyst contained 60% aluminum nitrate, 40% water and no urea. The comparative test was used with this same catalyst and with no polyvinyl alcohol present. Results given in Table VI show that the resin binder system of this invention gives improved curing over the system without the polymeric polyhydroxy compound even when no urea is present in the curing agent.

TABLE VI

| Resin | Tensile Strength (psi) After Dwell Times of | | | |
|---|---|---|---|---|
| | 10 sec | 20 sec | 30 sec | 40 sec |
| Example 6 | 107 | 125 | 140 | 146 |
| Comparative Test 6 | >25 | 50 | 50 | 50 |

What is claimed is:

1. An acidic curing agent which causes the rapid curing of resin systems containing phenolic resole resins and furfuryl alcohol used in the preparation of foundry cores and molds, which comprises from about 5% to about 60% by weight of an acid salt selected from the group consisting of aluminum nitrate, ferric nitrate and mixtures thereof, from about 2% to about 20% by weight of a water-soluble polymeric polyhydroxy compound, and at least sufficient water to give a homogeneous solution.

2. The composition of claim 1 characterized in that the polymeric polyhydroxy compound is selected from the group consisting of polyvinyl alcohol, hydroxyethyl cellulose, dextrin and mixtures thereof.

3. The composition of claim 1 characterized in that the curing agent further comprises from about 15% to about 45% urea by weight.

4. The composition of claim 3 characterized in that the polymeric polyhydroxy compound consists of polyvinyl alcohol, hydroxyethyl cellulose, dextrin and mixtures thereof.

5. A foundry core composition comprising a mixture of sand and from about 0.8% to about 4% by weight of sand, of a binder composition comprising:
   a. a resin-forming component comprising furfuryl alcohol and phenolic rsole resin, the weight ratio of the furfuryl alcohol to phenolic resole resin being from about 0.05:1 to 2:1;
   b. from about 0.4% to about 5% by weight of a water-soluble polymeric polyhydroxy compound;
   c. from about 5% to about 40% by weight of a curing agent comprising an acid salt selected from the group consisting of aluminum nitrate, ferric nitrate and mixtures thereof, and an amount of water at least sufficient to dissolve the acid salt.

6. The composition of claim 5 characterized in that the polymeric polyhydroxy compound is selected from the group consisting of polyvinyl alcohol, hydroxyethyl cellulose, dextrin and mixtures thereof.

7. The composition of claim 5 characterized in that the curing agent further comprises from about 15% to about 45% by weight urea.

8. The composition of claim 7 characterized in that the polymeric polyhydroxy compound is selected from the group consisting of polyvinyl alcohol, hydroxyethyl cellulose, dextrin and mixtures thereof.

9. The composition of claim 5 characterized in that the phenolic resole resin and furfuryl alcohol are heated together to give a furan-modified resole resin.

* * * * *